US012709579B2

(12) United States Patent
Colby et al.

(10) Patent No.: US 12,709,579 B2
(45) Date of Patent: Aug. 18, 2026

(54) EXFOLIATED BORON NITRIDE FOR INTERFACE COATING FOR CERAMIC MATRIX COMPOSITES

(71) Applicant: Raytheon Technologies Corporation, Farmington, CT (US)

(72) Inventors: Mary Colby, West Hartford, CT (US); Kenneth Petroski, Anaheim, CA (US); Andrew Joseph Lazur, La Jolla, CA (US)

(73) Assignee: RTX Corporation, Farmington, CT (US)

( * ) Notice: Subject to any disclaimer, the term of this patent is extended or adjusted under 35 U.S.C. 154(b) by 1014 days.

(21) Appl. No.: 17/886,830

(22) Filed: Aug. 12, 2022

(65) Prior Publication Data

US 2024/0051879 A1 Feb. 15, 2024

(51) Int. Cl.
*C04B 35/628* (2006.01)
*C04B 41/45* (2006.01)

(52) U.S. Cl.
CPC .. *C04B 35/62868* (2013.01); *C04B 35/62863* (2013.01); *C04B 41/4531* (2013.01); *C04B 2235/5244* (2013.01)

(58) Field of Classification Search
CPC ........ C04B 35/62868; C04B 35/62863; C04B 35/62844; C04B 35/62894; C04B 35/80; C04B 2235/5244
See application file for complete search history.

(56) References Cited

U.S. PATENT DOCUMENTS

| | | | |
|---|---|---|---|
| 8,303,922 B2 | 11/2012 | Lin et al. | |
| 9,683,299 B2 | 6/2017 | Mcalister | |
| 2015/0284295 A1* | 10/2015 | Magdefrau | C04B 35/62868 501/92 |
| 2016/0325994 A1 | 11/2016 | Qu et al. | |
| 2022/0055955 A1* | 2/2022 | Kidd | C04B 35/6286 |

FOREIGN PATENT DOCUMENTS

| | | | |
|---|---|---|---|
| CN | 113979752 A * | 1/2022 | C04B 35/80 |
| CN | 114804895 A | 7/2022 | |
| FR | 3059322 A1 | 6/2018 | |
| JP | 4936721 B2 | 3/2012 | |
| WO | 02072502 A1 | 9/2002 | |
| WO | 2020222013 A1 | 11/2020 | |

OTHER PUBLICATIONS

Extended European Search Report for EP Application No. 23187942.0, dated Jan. 16, 2024, 7 pages.

* cited by examiner

*Primary Examiner* — Laura A Auer
(74) *Attorney, Agent, or Firm* — Kinney & Lange, P.A.

(57) ABSTRACT

A coated fiber structure for use in a ceramic matrix composite comprises a fiber and a fiber coating arrangement applied to and at least partially circumscribing the fiber. The fiber coating arrangement comprises a first boron nitride layer comprising exfoliated hexagonal boron nitride, a silicon carbide layer extending at least partially coaxially with and in direct contact with the first boron nitride layer, and a second boron nitride layer radially opposite the silicon carbide layer, with respect to the first boron nitride layer.

20 Claims, 4 Drawing Sheets

EXFOLIATED BORON NITRIDE FOR INTERFACE COATING FOR CERAMIC MATRIX COMPOSITES

BACKGROUND

The present invention relates generally to ceramic matrix composites, and more particularly to the formation of fiber protective layers.

Fiber-reinforced ceramic matrix composites (CMCs) have been developed for the manufacture of components that are exposed to high temperatures, corrosive environments, and mechanical stress. CMCs are of particular interest in the aerospace industry and their use has been widely adopted for high temperature aircraft applications. While CMCs can provide desirable properties, they are susceptible to degradation. Over time, ceramic materials can form microcracks that expose the ceramic material to oxygen or other corrosive elements. To limit damage to fibers or through thickness cracks, fibers can be coated with one or more rigidized interface coating (IFC) layers, which can arrest and deflect cracks. While providing some protection, current interfacial coatings have limited oxidation resistance and/or stability at elevated temperatures and are susceptible to degradation over time. Accordingly, new protective materials and coating schemes with greater oxidation resistance and stability at high temperatures and in corrosive environments are desirable to enhance survivability of the CMC components during operation.

SUMMARY

A coated fiber structure for use in a ceramic matrix composite comprises a fiber and a fiber coating arrangement applied to and at least partially circumscribing the fiber. The fiber coating arrangement comprises a first boron nitride layer comprising exfoliated hexagonal boron nitride, a silicon carbide layer extending at least partially coaxially with and in direct contact with the first boron nitride layer, and a second boron nitride layer radially opposite the silicon carbide layer, with respect to the first boron nitride layer.

A method of forming a ceramic matrix composite comprises applying a mixture of exfoliated hexagonal boron nitride to a plurality of ceramic fibers, the exfoliated hexagonal boron nitride at least partially forming a first boron nitride layer, depositing a silicon carbide layer on the first boron nitride layer, depositing a second boron nitride layer radially opposite the silicon carbide layer with respect to the first boron nitride layer, and depositing a silicon carbide matrix on the plurality of ceramic fibers.

Figure 1:
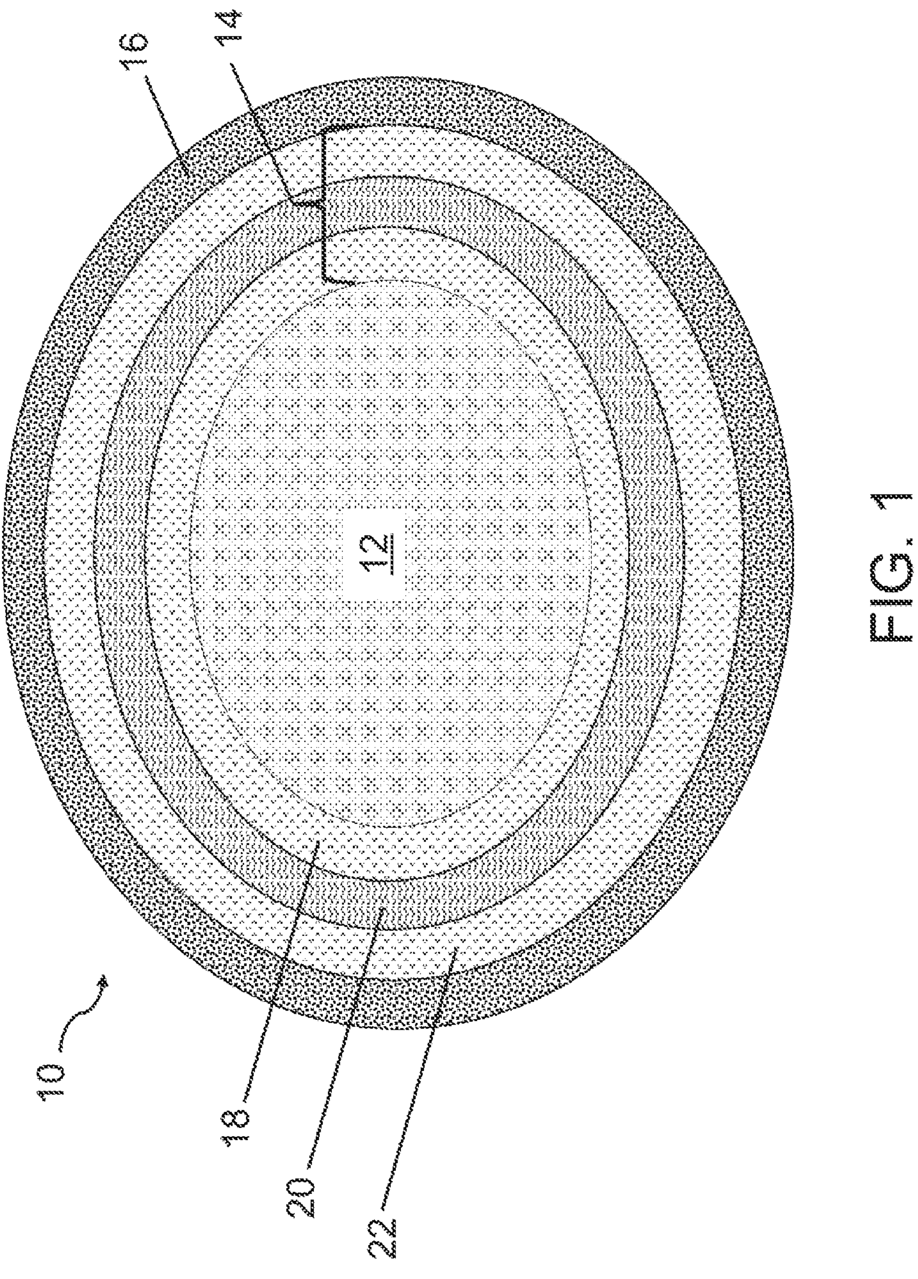
FIG. 1 is a simplified cross-sectional illustration of a ceramic fiber with a fiber coating arrangement.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents various fiber coating arrangements (e.g., IFCs) incorporating hexagonal boron nitride (h-BN) for improving mechanical, thermal, and/or oxidation resistance properties of CMCs.

FIG. 1 is a simplified cross-sectional view of coated fiber 10 belonging to a CMC suitable for use in, for example, a gas turbine engine. Coated fiber 10 includes ceramic fiber 12 circumscribed by fiber coating arrangement 14 and matrix 16. In the embodiment shown in FIG. 1, fiber coating arrangement 14 can include, beginning nearest to fiber 12 and working outward toward matrix 16, inner BN layer 18 in direct contact with fiber 12, silicon carbide (SiC) layer 20 in direct contact with innermost layer 18, and outer BN layer 22 in direct contact with SiC layer 20. When deposited, matrix 16 surrounds outer BN layer 22 of fiber coating arrangement 14, such that fiber coating arrangement 14 is disposed radially between fiber 12 and matrix 16. In general, the layers of coating arrangement 14 are coaxial/coextensive with fiber 12. However, it should be understood that a given layer need not be completely coaxial/coextensive with the underlying fiber 12 for coating arrangement 14 to provide desirable protection to the encompassing CMC. That is, a given layer can have discontinuities and still be effective.

Fiber 12 can be formed from SiC or other suitable ceramic material. Multiple fibers 12 can be arranged in various woven or non-woven, unidirectional or multidirectional architectures. Either/both inner BN layer 18 and outer BN layer 22 can partially or fully comprise exfoliated h-BN. Also referred to as graphitic boron nitride (i.e., g-BN), h-BN has a lattice structure similar to graphite, with basal planes of alternating, covalently bonded B and N atoms. In one embodiment, either/both inner BN layer 18 and outer BN layer 22 can comprise solely exfoliated h-BN, while in an alternative embodiment, one or both layers can include non-crystalline, amorphous BN (a-BN) and/or partially ordered, turbostratic BN (t-BN). Enhancing particles can also be applied with the h-BN, as is discussed in greater detail below. Matrix 16 can be formed from SiC or other suitable ceramic material.

Figure 2:
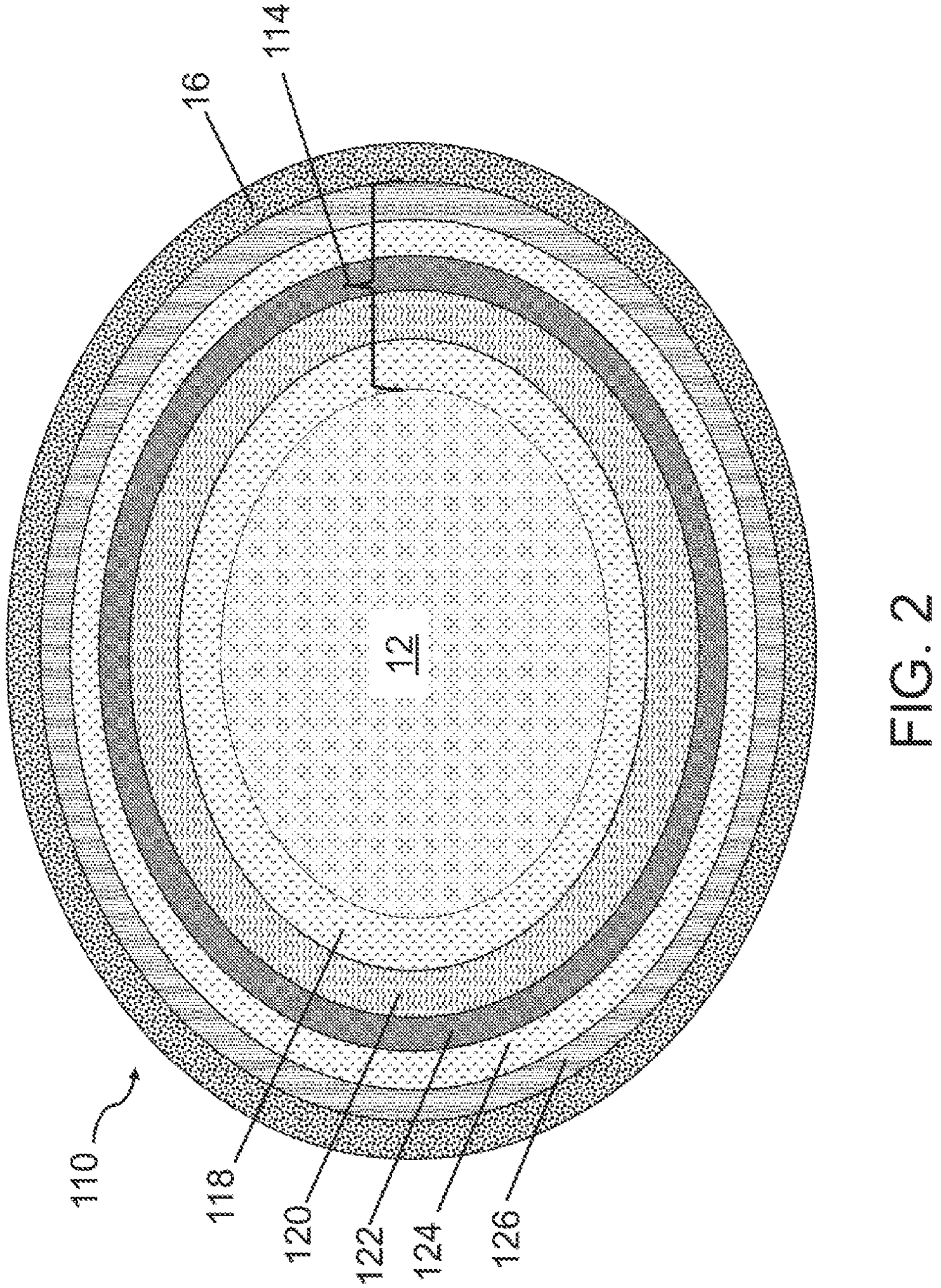
FIG. 2 is a simplified cross-sectional illustration of a ceramic fiber with an alternative fiber coating arrangement.

FIG. 2 is a simplified cross-sectional view of coated fiber 110 with fiber 12, matrix 16, and alternative fiber coating arrangement 114 disposed therebetween. Beginning nearest to fiber 12 and working out toward matrix 16, fiber coating arrangement 114 can include inner BN layer 118 in direct contact with fiber 12, SiC layer 120 in direct contact with inner BN layer 118, carbon layer 122 in direct contact with SiC layer 120, outer BN layer 124 in direct contact with carbon layer 122, and silicon-doped BN (SiBN) layer 126 in direct contact with outer BN layer 124. When deposited, matrix 16 surrounds SiBN layer 126 of fiber coating arrangement 114. Similar to BN layers 18, 22 of fiber coating arrangement 14, BN layers 118, 124 of fiber coating arrangement 114 can include varying degrees of exfoliated h-BN with a-BN, t-BN, and/or particles, as is discussed in greater detail below.

Additional alternative embodiments based on fiber coating arrangements 14 and/or 114 are contemplated herein. For example, fiber coating arrangement 14 can include a similar carbon layer and/or SiBN layer. In either fiber coating arrangement 14, 114, the carbon layer (e.g., carbon layer 122) can be positioned elsewhere, for example, in direct contact with fiber 12. In either fiber coating arrangement 14, 114, only a single BN layer (e.g., inner BN layer 18, 118) can be present. Additional layers of BN, SiC, C, and/or SiBN are also contemplated herein.

In operation of a CMC with coated fibers 10 and/or 110, as cracks form and propagate through matrix 16 and into the layers of the respective fiber coating arrangements 14, 114, outer BN layers 22, 124, if included, can deflect cracks away from SiC layers 20, 120 and become debonded. If included, carbon layer 122, which is weaker than outer BN layer 124, also becomes debonded to allow SiC layer 120 to remain intact and protect inner BN layer 118 and fiber 12 from oxidation. SiBN layer 126, if included, can increase the silicon content of fiber coating arrangements 14, 114, oxidizing to form, with boron, a more stable glassy material than molten boron (i.e., boria) alone. Silicon within SiC layers 20, 120 can oxidize to form a protective silica layer, preventing any oxidized and/or molten boron from outer BN layers 22, 124 from infiltrating inner layers and fiber 12.

With continued reference to the embodiments of FIGS. 1 and 2, inner BN layers 18, 118, and/or outer BN layers 22, 124 can include enhancing particles. Such particles can be one or a combination of metallics, borides, nitrides, and carbides. More specifically, particle materials can include silicon nitride ($Si_3N_4$), SiC, boron carbide ($B_4C$), titanium nitride (TiN), titanium carbide (TiC), titanium (Ti), tungsten (W), and hafnium (Hf), to name a few, non-limiting examples. Particles can be nanoscale to sub-micron in size, with possible particle shapes including flakes, rods, spheres, platelets, etc. Such particles can function as a getter, advantageously removing oxygen in an operational environment of the CMC, to help reduce harmful oxidation. Particle loading can, in an exemplary embodiment, range from 0.5 percent by weight (wt %) to 20 wt %.

Figure 3:
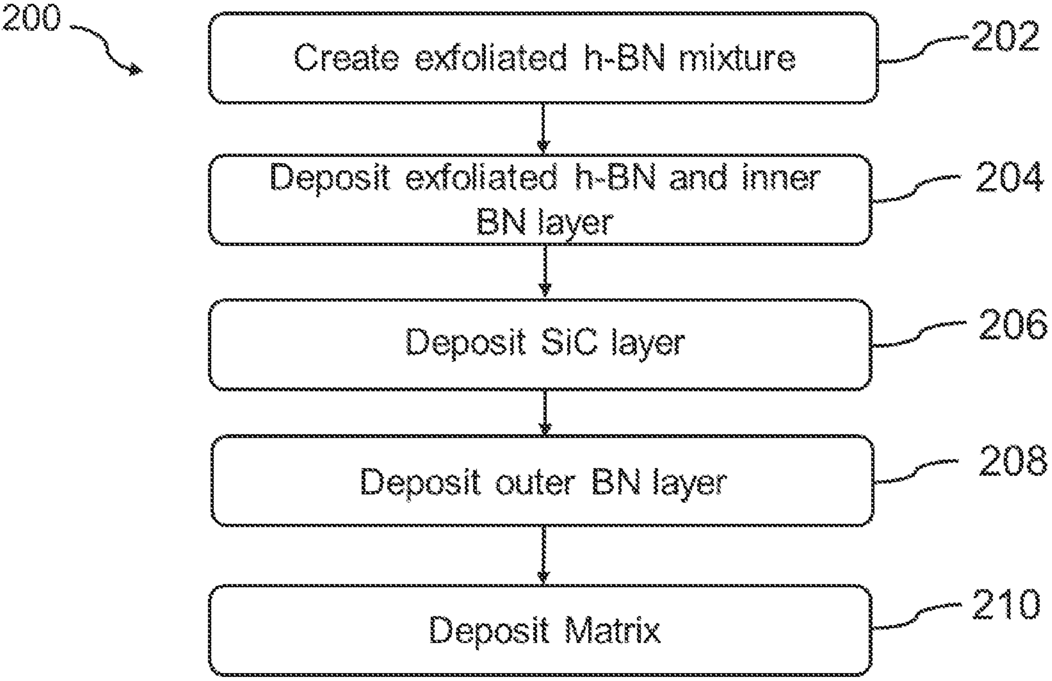
FIG. 3 is a flow chart illustrating select steps of a method for forming a CMC with a fiber coating arrangement.

FIG. 3 is a method flowchart illustrating steps 202-210 of a first method, method 200, for forming a CMC with coated fibers (e.g., coated fibers 10 and/or 110). At step 202, h-BN can be exfoliated, and in some embodiments, combined with a particle solution to create an exfoliated h-BN mixture. A bulk h-BN material can be added to a solution including one or more of organic solvents, surfactants, proteins, etc. for stabilizing the h-BN sheets resulting from exfoliation. Exfoliation can occur using one or a combination of chemical and mechanical means. Chemical means can include adding a basic substance (e.g., NaOH, KOH, etc.) to the solution. Mechanical means can include sonication in a continuous flow chamber or agitation to create a mechanical sheer force within the solution. The latter can be preferable for preparing larger volumes of exfoliated h-BN in solution. Other chemical and/or mechanical means are contemplated herein. A separation technique, such as centrifugation, can be used to create a relatively homogeneous solution of nanoscale exfoliated h-BN sheets. A separate solution of particles (e.g., metallics, borides, nitrides, and/or carbides) can optionally be mixed with the exfoliated h-BN solution, if desired, in the fiber coating arrangement. Depending on the solvents used and concentration of exfoliated h-BN and particles (if added), the resulting mixture of exfoliated h-BN can be a solution or slurry.

At step 204, the exfoliated h-BN can be applied to a preform of ceramic fibers (e.g. fibers 12). The fibrous preform can preferably be desized and/or debulked prior to step 204. Application techniques can include drop casting, spray coating, dip coating, or vacuum infiltration. The fibrous preform can be dried prior to the deposition of subsequent coatings. The ambient temperature for application can be relatively low, for example, ranging from 0° C. to 100° C., and preferably, from 18° C. to 30° C.

In some embodiments, step 204 can further include deposition of additional BN over the applied h-BN via chemical vapor infiltration (CVI) or chemical vapor deposition (CVD). In such an embodiment, the resulting BN-containing layer (e.g., inner BN layers 18, 118) can include both the more aligned exfoliated h-BN, and the less aligned, a-BN and/or t-BN deposited via CVI/CVD. It is further possible to deposit additional h-BN via CVI/CVD. The exfoliated h-BN can reduce the duration of the CVI/CVD process when compared to deposition of BN using either CVI/CVD alone. In some cases, the exfoliated h-BN can act as a template for epitaxial growth of more h-BN from CVI/CVD at a lower temperature than might otherwise be required. In yet another alternative embodiment, h-BN can be exclusively applied via CVI/CVD.

At step 206, a layer of SiC (e.g., SiC layers 20, 120) can be applied to the BN layer using CVI. At step 208, a second BN layer (e.g., outer BN layers 22, 124) can be applied, if desired in the particular coating arrangement. The second BN layer can be substantially similar to the BN layer applied in step 204, thus step 208 can be carried out in a substantially similar manner, for example, including the application of exfoliated h-BN with a-BN, t-BN, and/or h-BN via CVI/CVD.

At step 210, a matrix (e.g., matrix 16) can be deposited on fibers and encompassing coating systems within the preform. The matrix can be deposited using CVI, which can be carried out until the resulting CMC has reached the desired residual porosity. Other techniques for matrix formation are contemplated herein, such as one or a combination of CVI/CVD, slurry infiltration, melt infiltration, and polymer infiltration and pyrolysis. Protective coatings for the CMC (e.g., thermal barrier coatings, environmental barrier coatings, etc.) can optionally be applied after step 210.

If included in the fiber coating system, a carbon layer can be applied, via CVI, prior to step 204, or between steps 206 and 208, depending on the embodiment. Similarly, a layer of SiBN can be applied via CVI, for example, between steps 208 and 210.

Figure 4:
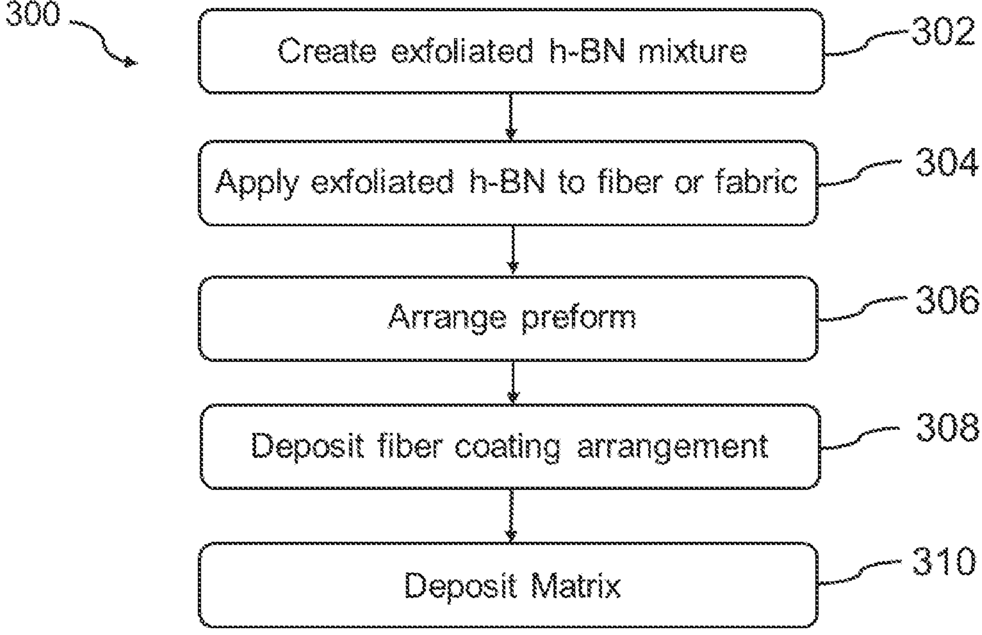
FIG. 4 is a flow chart illustrating select steps of an alternative method for forming a CMC with a fiber coating arrangement.

FIG. 4 is a method flowchart illustrating steps 302-310 of an alternative method, method 300, for forming a CMC with coated fibers (e.g., coated fiber 10). Step 302 can be substantially similar to step 202 with respect to the preparation of an exfoliated h-BN mixture (with or without particles).

At step 304, the exfoliated h-BN mixture can be applied to one or more fibers (e.g., fibers 12) prior to incorporation into a preform. In one embodiment, application of the mixture can occur at the individual fiber (i.e., tow) level, prior to weaving. In an alternative embodiment, exfoliated h-BN can be applied to a fabric or ply. Like step 204 of method 200, step 304 can include any of drop casting, spray coating, dip coating, or vacuum infiltration. The individual fibers or fabric can be tensioned (e.g., using opposing rollers) while exfoliated h-BN is applied. A polymer-based solution, such as polyvinyl alcohol (PVA) can be applied over the exfoliated h-BN to stabilize the h-BN during subsequent processing. Alternatively, PVA can be added to the exfoliated h-BN mixture to be concurrently applied to the fiber or fabric. At step 306, fibers and/or fabric coated with exfoliated h-BN can be arranged into a preform. The resulting preform can be desized and/or debulked to remove any residual sizing/binders (e.g., PVA).

At step 308, a fiber coating arrangement (e.g., fiber coating arrangements 14, 114) can be deposited on the preform. This can include deposition of BN, via CVI/CVD, over exfoliated h-BN, although exfoliated h-BN alone can serve as an inner BN layer. Subsequent layers (e.g., SiC, carbon, and/or SiBN) can all be deposited, via CVI, in a manner and sequence substantially similar to steps 204 to 208 of method 200. A matrix (e.g., matrix 16) can be applied at step 310 in a manner substantially similar to step 210.

A CMC component formed with the disclosed fiber coating arrangement can be incorporated into aerospace, maritime, or industrial equipment, to name a few, non-limiting examples.

Discussion of Possible Embodiments

The following are non-exclusive descriptions of possible embodiments of the present invention.

A coated fiber structure for use in a ceramic matrix composite comprises a fiber and a fiber coating arrangement applied to and at least partially circumscribing the fiber. The fiber coating arrangement comprises a first boron nitride layer comprising exfoliated hexagonal boron nitride, a silicon carbide layer extending at least partially coaxially with and in direct contact with the first boron nitride layer, and a second boron nitride layer radially opposite the silicon carbide layer, with respect to the first boron nitride layer.

The fiber structure of the preceding paragraph can optionally include, additionally and/or alternatively, any one or more of the following features, configurations and/or additional components:

The above fiber structure can further include particles within the first boron nitride layer, the particles being formed from at least one of metallics, borides, nitrides, and carbides.

In any of the above fiber structures, the first boron nitride layer can further include at least one of amorphous boron nitride and turbostratic boron nitride.

In any of the above fiber structures, the first boron nitride layer can extend at least partially coaxially with and in direct contact with the fiber.

In any of the above fiber structures, the second boron nitride layer can include at least one of hexagonal boron nitride, amorphous boron nitride, and turbostratic boron nitride.

Any of the above fiber structures can further include particles within the second boron nitride layer, the particles being formed from at least one of metallics, borides, nitrides, and carbides.

Any of the above fiber structures can further include a carbon layer extending at least partially coaxially with and in direct contact with the silicon carbide layer.

Any of the above fiber structures can further include a silicon-doped boron nitride layer extending at least partially coaxially with and in direct contact with the second boron nitride layer.

A ceramic matrix composite can include any of the above fiber structures, and a silicon carbide matrix formed upon the fiber coating arrangement of any of the above fiber structures.

A method of forming a ceramic matrix composite comprises applying a mixture of exfoliated hexagonal boron nitride to a plurality of ceramic fibers, the exfoliated hexagonal boron nitride at least partially forming a first boron nitride layer, depositing a silicon carbide layer on the first boron nitride layer, depositing a second boron nitride layer radially opposite the silicon carbide layer with respect to the first boron nitride layer, and depositing a silicon carbide matrix on the plurality of ceramic fibers.

The method of the preceding paragraph can optionally include, additionally and/or alternatively, any one or more of the following features, configurations and/or additional components:

The above method can further include prior to applying the mixture of exfoliated hexagonal boron nitride, exfoliating stock boron nitride using at least one of a chemical or mechanical exfoliation process.

Any of the above methods can further include adding a solution of particles to the mixture of exfoliated hexagonal boron nitride, the particles being formed from at least one of metallics, borides, nitrides, and carbides.

In any of the above methods, the step of applying the mixture of exfoliated hexagonal boron nitride can include applying the mixture to individual ones of the plurality of ceramic fibers using at least one of a drop casting, spray coating, dip coating, and vacuum infiltration technique.

Any of the above methods can further include weaving the plurality of ceramic fibers into a fabric, and incorporating the fabric into a fibrous preform.

In any of the above methods, the step of applying the mixture of exfoliated hexagonal boron nitride can include applying the mixture to a preform including the plurality of ceramic fibers using at least one of a drop casting, spray coating, dip coating, and vacuum infiltration technique.

Any of the above methods can further include depositing a carbon layer on the silicon carbide layer, and depositing a silicon-doped boron nitride layer on the second boron nitride layer.

In any of the above methods, each of the carbon layer and silicon-doped boron nitride layer can be deposited using chemical vapor infiltration.

In any of the above methods, forming the first boron nitride layer can further include depositing at least one of hexagonal boron nitride, amorphous boron nitride, and turbostratic boron nitride using chemical vapor infiltration.

In any of the above methods, the silicon carbide layer can be deposited using chemical vapor infiltration.

In any of the above methods, the matrix can be deposited using at least one of chemical vapor infiltration, chemical vapor deposition, slurry infiltration, melt infiltration, and polymer infiltration and pyrolysis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A coated fiber structure for use in a ceramic matrix composite, the coated fiber structure comprising:

a fiber; and a fiber coating arrangement applied to and at least partially circumscribing the fiber, the fiber coating arrangement comprising:

a first boron nitride layer comprising exfoliated hexagonal boron nitride sheets;

a silicon carbide layer extending at least partially coaxially with and in direct contact with the first boron nitride layer; and a second boron nitride layer radially opposite the silicon carbide layer, with respect to the first boron nitride layer.

2. The fiber structure of claim 1 and further comprising: particles within the first boron nitride layer, the particles being formed from at least one of metallics, borides, nitrides, and carbides.

3. The fiber structure of claim 1, wherein the first boron nitride layer further comprises at least one of amorphous boron nitride and turbostratic boron nitride.

4. The fiber structure of claim 1, wherein the first boron nitride layer extends at least partially coaxially with and in direct contact with the fiber.

5. The fiber structure of claim 1, wherein the second boron nitride layer comprises at least one of hexagonal boron nitride, amorphous boron nitride, and turbostratic boron nitride.

6. The fiber structure of claim 5 and further comprising: particles within the second boron nitride layer, the particles being formed from at least one of metallics, borides, nitrides, and carbides.

7. The fiber structure of claim 1 and further comprising: a carbon layer extending at least partially coaxially with and in direct contact with the silicon carbide layer.

8. The fiber structure of claim 1 and further comprising: a silicon-doped boron nitride layer extending at least partially coaxially with and in direct contact with the second boron nitride layer.

9. A ceramic matrix composite comprising:

a plurality of coated fiber structures of claim 1; and a silicon carbide matrix formed upon the fiber coating arrangement of the plurality of coated fiber structures.

10. A method of forming a ceramic matrix composite, the method comprising:

applying a mixture of exfoliated hexagonal boron nitride sheets to a plurality of ceramic fibers, the exfoliated hexagonal boron nitride sheets at least partially forming a first boron nitride layer;

depositing a silicon carbide layer on the first boron nitride layer, the silicon carbide layer extending at least partially coaxially with and in direct contact with the first boron nitride layer;

depositing a second boron nitride layer radially opposite the silicon carbide layer with respect to the first boron nitride layer;

wherein the first boron nitride layer, the silicon carbide layer, and the second boron nitride layer form a fiber coating arrangement at least partially circumscribing the plurality of ceramic fibers; and depositing a silicon carbide matrix on the plurality of ceramic fibers.

11. The method of claim 10 and further comprising: prior to applying the mixture of exfoliated hexagonal boron nitride, exfoliating stock boron nitride using at least one of a chemical or mechanical exfoliation process.

12. The method of claim 11 and further comprising: adding a solution of particles to the mixture of exfoliated hexagonal boron nitride, the particles being formed from at least one of metallics, borides, nitrides, and carbides.

13. The method of claim 10, wherein the step of applying the mixture of exfoliated hexagonal boron nitride comprises: applying the mixture to individual ones of the plurality of ceramic fibers using at least one of a drop casting, spray coating, dip coating, and vacuum infiltration technique.

14. The method of claim 13 and further comprising:

weaving the plurality of ceramic fibers into a fabric; and incorporating the fabric into a fibrous preform.

15. The method of claim 10, wherein the step of applying the mixture of exfoliated hexagonal boron nitride comprises: applying the mixture to a preform including the plurality of ceramic fibers using at least one of a drop casting, spray coating, dip coating, and vacuum infiltration technique.

16. The method of claim 10 and further comprising:

depositing a carbon layer on the silicon carbide layer; and depositing a silicon-doped boron nitride layer on the second boron nitride layer.

17. The method of claim 16, wherein each of the carbon layer and silicon-doped boron nitride layer are deposited using chemical vapor infiltration.

18. The method of claim 10, wherein forming the first boron nitride layer further comprises: depositing at least one of hexagonal boron nitride, amorphous boron nitride, and turbostratic boron nitride using chemical vapor infiltration.

19. The method of claim 10, wherein the silicon carbide layer is deposited using chemical vapor infiltration.

20. The method of claim 10, wherein the matrix is deposited using at least one of chemical vapor infiltration, chemical vapor deposition, slurry infiltration, melt infiltration, and polymer infiltration and pyrolysis.

* * * * *